United States Patent
Fu

(10) Patent No.: US 10,103,880 B2
(45) Date of Patent: Oct. 16, 2018

(54) METHOD AND SYSTEM FOR QUANTUM KEY DISTRIBUTION BASED ON TRUSTED COMPUTING

(71) Applicant: Alibaba Group Holding Limited, George Town, Grand Cayman (KY)

(72) Inventor: Yingfang Fu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 15/717,553

(22) Filed: Sep. 27, 2017

(65) Prior Publication Data

US 2018/0109372 A1    Apr. 19, 2018

(30) Foreign Application Priority Data

Oct. 14, 2016    (CN) .......................... 2016 1 0900271

(51) Int. Cl.
*H04L 9/00* (2006.01)
*H04L 9/08* (2006.01)

(52) U.S. Cl.
CPC ............ *H04L 9/083* (2013.01); *H04L 9/0852* (2013.01); *H04L 9/0861* (2013.01); *H04L 9/0894* (2013.01)

(58) Field of Classification Search
CPC ..... H04L 9/083; H04L 9/0852; H04L 9/0861; H04L 9/0894
See application file for complete search history.

(56) References Cited

U.S. PATENT DOCUMENTS

| | | |
|---|---|---|
| 9,323,901 B1 | 4/2016 | Nair |
| 2005/0259825 A1 | 11/2005 | Trifonov |
| 2006/0026693 A1 | 2/2006 | Bade |
| 2007/0016794 A1 | 1/2007 | Harrison |
| 2007/0076889 A1 | 4/2007 | DeRobertis |
| 2007/0147292 A1 | 6/2007 | Van Ewijk |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2009/0034733 A1 | 2/2009 | Raman |
| 2009/0092252 A1 | 4/2009 | Noll |
| 2009/0106551 A1 | 4/2009 | Boren |
| 2009/0271634 A1 | 10/2009 | Boult |

(Continued)

FOREIGN PATENT DOCUMENTS

| | | |
|---|---|---|
| EP | 0962070 | 12/1999 |
| WO | 2012098543 | 7/2012 |

(Continued)

*Primary Examiner* — Beemnet W Dada
(74) *Attorney, Agent, or Firm* — Shun Yao; Park, Vaughan, Fleming & Dowler LLP

(57) ABSTRACT

One embodiment described herein provides a system and method for negotiating quantum data keys between first and second entities. During operation, the system performs a mutual authentication between the first and second entities. In response to the mutual authentication succeeding, the first entity receives one or more sets of key-generation parameters from the second entity. In response to validating the sets of key-generation parameters, the first entity sends an acknowledgment message to the second entity, and extracts, from a quantum string shared between the first and second entities, one or more quantum data keys based on the key-generation parameters. A respective quantum data key comprises a number of bits extracted from the quantum string.

26 Claims, 11 Drawing Sheets

(56) References Cited

U.S. PATENT DOCUMENTS

| | | |
|---|---|---|
| 2010/0211787 A1 | 8/2010 | Bukshpun |
| 2010/0265077 A1 | 10/2010 | Humble |
| 2011/0069972 A1 | 3/2011 | Wiseman |
| 2011/0231615 A1 | 9/2011 | Ober |
| 2012/0177201 A1 | 7/2012 | Ayling |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0227286 A1 | 8/2013 | Brisson |
| 2013/0251145 A1 | 9/2013 | Lowans |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0181308 A1 | 6/2015 | Ducharme |
| 2015/0236852 A1 | 8/2015 | Tanizawa |
| 2015/0288542 A1 | 10/2015 | Ashrafi |
| 2015/0381363 A1 | 12/2015 | Teixeira |
| 2016/0021068 A1 | 1/2016 | Jueneman |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |

FOREIGN PATENT DOCUMENTS

| | | |
|---|---|---|
| WO | 2013026086 | 2/2013 |
| WO | 2016070141 | 5/2016 |

METHOD AND SYSTEM FOR QUANTUM KEY DISTRIBUTION BASED ON TRUSTED COMPUTING

RELATED APPLICATION

Under 35 U.S.C. § 119, this application claims the benefit and right of priority of Chinese Patent Application No. 201610900271.1, filed on 14 Oct. 2016.

This application is related to U.S. patent application Ser. No. 15/716,965, entitled "METHOD AND SYSTEM FOR DATA SECURITY BASED ON QUANTUM COMMUNICATION AND TRUSTED COMPUTING," by inventor Yingfang Fu, filed 27 Sep. 2017; and U.S. patent application Ser. No. 15/717,729, entitled "METHOD AND SYSTEM FOR SECURE DATA STORAGE AND RETRIEVAL," by inventor Yingfang Fu, filed 27 Sep. 2017, the disclosures of which are incorporated herein by reference in their entirety for all purposes.

BACKGROUND

Field

This disclosure is generally related to data security. More specifically, this disclosure is related to a system and method for quantum key distribution based on trusted computing technologies.

Related Art

In recent years, quantum encryption technologies have been developed. In quantum communication, information is transmitted based on quantum states, and the data security can be guaranteed by the laws of quantum mechanics, such as the uncertainty principle, the principle of quantum state measurement, and the no-cloning theorem. It has been shown that quantum cryptography can achieve unconditional data transmission security and detectability against eavesdroppers.

A number of quantum key distribution schemes (e.g., BB84 and E91 schemes) have been developed to allow two communication parties to securely produce and share a secret key known only to them. The two communication parties can then use the shared secret key to communicate with each other.

On the other hand, cloud computing has become a highly demanded service or utility due to the advantages of high computing power, cheap cost of services, high performance, scalability, accessibility as well as availability. In cloud computing, different services, including servers, storage, and application, can be delivered by the service provider to a customer's computers and devices via the Internet. More specifically, cloud computing allows users, and enterprises, with various computing capabilities to store and process data in either a privately owned cloud, or on a third-party server located in a data center in order to make data accessing mechanisms more efficient and reliable.

Although QKD systems may be deployed in cloud computing, they often cannot meet the quantity demand of the large-scale cloud computing, because raw keys produced by QKD schemes often need further optimization before they can be used in batches. Moreover, although the secrecy of the key can be guaranteed, QKD alone cannot provide user authentication and guarantee the integrity of the platforms of the communicating parties.

SUMMARY

One embodiment described herein provides a system and method for negotiating quantum data keys between first and second entities. During operation, the system performs a mutual authentication between the first and second entities. In response to the mutual authentication succeeding, the first entity receives one or more sets of key-generation parameters from the second entity. In response to validating the sets of key-generation parameters, the first entity sends an acknowledgment message to the second entity, and extracts, from a quantum string shared between the first and second entities, one or more quantum data keys based on the key-generation parameters. A respective quantum data key comprises a number of bits extracted from the quantum string.

In a variation on this embodiment, the first and second entities are each equipped with a trusted-computing module, and performing the mutual authentication comprises exchanging a trusted measurement report associated with each of the first and second entities.

In a further variation, the first entity stores the extracted quantum data keys within the trusted-computing module.

In a variation on this embodiment, the quantum string shared between the first and second entities is obtained via a quantum key distribution (QKD) process.

In a variation on this embodiment, a respective set of key-generation parameters specifies a plurality of keys having a same length, and the set of key-generation parameters comprises: a number parameter specifying a number of keys to be generated, a length parameter specifying a bit length of the to-be-generated keys, and a position parameter specifying a starting position of an initial to-be-generated key within the quantum string shared between the first and second entities.

In a variation on this embodiment, a respective set of key-generation parameters specifies a single to-be-generated key, and the set of key-generation parameters indicates the length of the single to-be-generated key and the starting position of the single to-be-generated key.

In a further variation, the lengths and starting positions of at least two keys are specified such that the two keys partially overlap, thereby resulting in a total number of bits in the extracted quantum data keys being more than a total number of bits in the quantum string shared between the first and second entities.

In a variation on this embodiment, while receiving the one or more sets of key-generation parameters, the first entity is configured to receive a hash function calculated by the second entity based on the key-generation parameters and a shared secret; and validating the sets of key-generation parameters comprises comparing the received hash function with a hash function calculated by the first entity.

In a variation on this embodiment, sending the acknowledgment message comprises: calculating a variation of at least one key-generation parameter; encrypting, using an encryption key, the calculated variation to obtain an encrypted message; and sending the encrypted message.

In a variation on this embodiment, the received one or more sets of key-generation parameters are encrypted using an encryption key associated with the first entity.

In a variation on this embodiment, the first and second entities belong to a cloud computing system, and the first or second entity comprises one of: a piece of equipment provided by a cloud provider and a piece of equipment provided by a cloud client.

In a further variation, the first and second entities each receive a trusted certificate and equipment private key from a trusted authorization center associated with the cloud computing system.

In a further variation, the first entity sends an authorization request to the trusted authorization center, which comprises a plurality of trusted control nodes. A respective trusted control node maintains a share of a system private key. The first entity receives from the trusted control nodes a set of subkeys, and generates an equipment private key specific to the first entity based on the received set of subkeys. A respective subkey received from a particular trusted control node is generated based on identity information associated with the first entity, trusted-computing platform information associated with the first entity, and a share of the system private key stored in the particular trusted control node.

Figure 1:
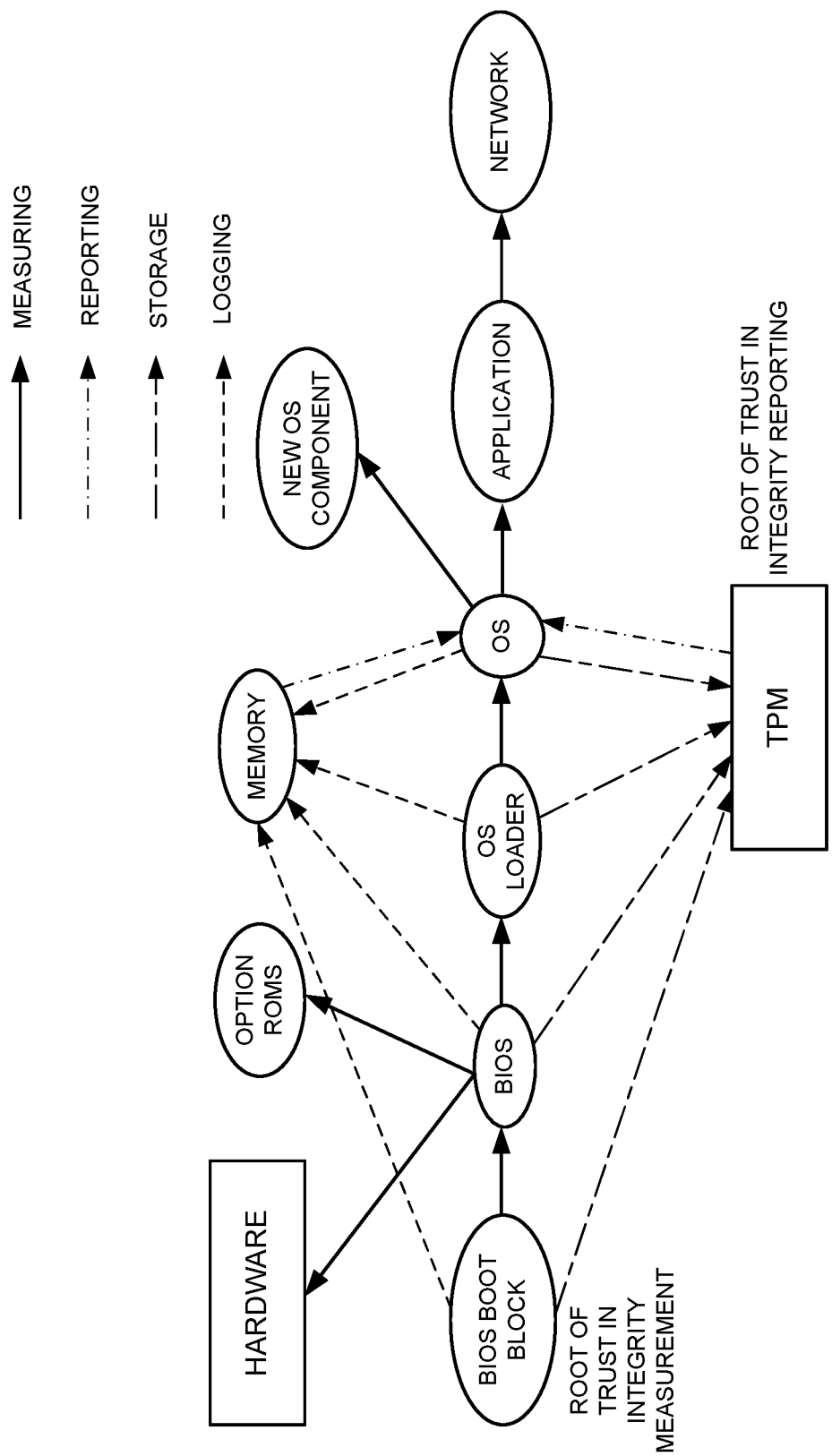
FIG. 1 illustrates the chain of trust in a PC as defined by the Trusted Computing Group.

Table 1 illustrates two exemplary mechanical quantity measurement schemes based on using two different sets of quantum states in accordance with one embodiment described herein.

Table 2 shows an exemplary shared secret quantum string, according to one embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system for generating a shared secret key using both quantum key distribution and trusted computing technologies are provided. During operation, a shared quantum string can first be generated by two communicating entities using a conventional quantum key distribution (QKD) scheme. The two entities are both trusted-computing-enabled, and can then further negotiate quantum data keys (which can later be used for data encryption) by exchanging and verifying trusted measurement reports. Multiple quantum data keys of same or different lengths can be generated from the same shared quantum string.

Quantum key distribution (QKD) mechanisms can ensure the secrecy of the initial quantum string. Trusted computing can be used for authentication of the client and server and for ensuring the integrity of the client and server. The combination of quantum key distribution and trusted computing can further enhance data security in a cloud computing environment.

In this disclosure, an entity is also referred to as a trusted entity (e.g., a trusted server or a trusted client) if the entity is equipped with modules that can enable trusted computing. Without specifying, it is assumed that all entities that provide or receive cloud computing services are trusted-computing-enabled.

Principles of Quantum Key Distribution

According to quantum physics, some physical quantities of the microscopic world cannot continuously change but take on certain discrete values, and the difference between two adjacent discrete values is referred to as a "quantum," e.g., a photon is a single quantum of light.

In traditional communication where laws of classical mechanics apply, digital information can be represented as bits, wherein each bit can have two states: e.g., "0s" and "1s," or "high" and "low" voltages. In contrast, in quantum communication where laws of classical mechanics do not apply, information is typically represented as quantum bits (qubits), which are units of quantum information. Each qubit can have two basic states: $|0\rangle$ or $\leftrightarrow$ and $|1\rangle$ or $\updownarrow$. In this case, the two quantum states $|0\rangle$ and $|1\rangle$ form a quantum state basis, which can be expressed as $\{|0\rangle, |1\rangle\}$.

Moreover, a quantum quantity can also take on a mixed state obtained by the superposition of the two basic states with coefficients $\alpha$, $\beta$, respectively. For example, if quantum basis $\{|0\rangle, |1\rangle\}$ is used, then a mixed state can be expressed as:

$$|\varphi\rangle = \alpha|0\rangle + \beta|1\rangle$$

For example, mixed quantum state basis $\{|+\rangle, |-\rangle\}$ can be generated by superpositioning the basic quantum states $|0\rangle/\leftrightarrow$ and $|1\rangle/\updownarrow$ using the following formulae:

$$|+\rangle = \frac{\leftrightarrow + \updownarrow}{\sqrt{2}},$$

$$|-\rangle = \frac{\leftrightarrow - \updownarrow}{\sqrt{2}}.$$

Note that in the above two bases of quantum state representations, states |0⟩ and |1⟩ are orthogonal to each other, while states |+⟩ and |−⟩ are orthogonal to each other.

In quantum mechanics, a given mechanical quantity can be measured using the above-described quantum states, which are also referred to as "measurement basis." For example, each mechanical quantity can be expressed by a Hermitian operator (or Hermitian matrix). When measuring such a mechanical quantity, the measurement results correspond to the eigenvalues (or the "characteristic values") of the Hermitian operator for this mechanical quantity. After the measurement, the quantum state being measured collapses to the eigenstates (or the "eigenvectors") corresponding to the obtained eigenvalues. Table 1 illustrates two exemplary mechanical quantity measurement schemes based on using two different sets of quantum states in accordance with one embodiment described herein.

TABLE 1

Mechanical Quantity Measurement Using a Set of Quantum States

| Mechanical Quanitity | Eigenvalues: 1, −1 Eigenstates: |0⟩, |1⟩ | Referred to as measuring using set {|0⟩, |1⟩} |
|---|---|---|
| $Z = \begin{pmatrix} 1 & 0 \\ 0 & -1 \end{pmatrix}$ | | |
| Mechanical Quantity | Eigenvalues: 1, 1 Eigenstates: |+⟩, |−⟩ | Referred to as measuring using set {|+⟩, |−⟩} |
| $Z = \begin{pmatrix} 0 & 1 \\ 1 & 0 \end{pmatrix}$ | | |

For example, when using quantum state basis {|0⟩, |1⟩} to measure quantum state $|\varphi\rangle = \alpha|0\rangle + \beta|1\rangle$, wherein $|\alpha|^2 + |\beta|^2 = 1$, we will obtain a measurement value of 1 with a probability of $|\alpha|^2$, wherein after the measurement the quantum state collapses to |0⟩; and we will obtain a measurement value of −1 with a probability of $|\beta|^2$, wherein after the measurement the quantum state collapses to |1⟩.

As another example, when using quantum state basis {|0⟩, |1⟩} to measure quantum state |0⟩, we will obtain state |0⟩ with probability 1. Similarly, when using quantum state basis {|+⟩, |−⟩} to measure quantum state |+⟩, we will obtain state |+⟩ with probability 1.

Furthermore, when using quantum state basis {|0⟩, |1⟩} to measure quantum state |+⟩, we will randomly obtain either state |0⟩ or state |1⟩. Similarly, when using quantum state basis {|+⟩, |−⟩} to measure state |0⟩, we will randomly obtain either state |+⟩ or state |−⟩.

Bennett-Brassard-84 (BB84) is a popular quantum key distribution protocol. BB84 uses the polarization states of single photons to transmit information. The usual polarization state pairs used are either the rectilinear basis of vertical (0°) and horizontal (90°), the diagonal basis of 45° and 135° or the circular basis of left- and right-handedness. Any two of these bases are conjugate to each other, so any two can be used in the protocol. In the BB84 scheme, sender Alice wishes to send a private key (e.g., a random string) to receiver Bob. Alice starts by generating a random bit and randomly selects from two quantum bases a quantum basis to encode the binary bit. Alice then transmits a single photon in the state specified to Bob, using the quantum channel. This process is then repeated from the random bit stage, with Alice recording the state, basis and time of each photon sent. Upon receiving a photon, Bob performs measurements using randomly selected basis. Bob does this for each photon he receives, recording the time, measurement basis used, and measurement result. After Bob has measured all the photons, he communicates with Alice over the public classical channel. Alice broadcasts the basis each photon was sent in, and Bob the basis each was measured in. They both discard photon measurements (bits) where Bob used a different basis, which is half on average, leaving half the bits as a shared key.

To check for the presence of an eavesdropper Eve, Alice and Bob can compare a predetermined subset of their remaining bit strings. If a third party has gained any information about the photons' polarization, this introduces errors into Bob's measurements. Other environmental conditions can cause errors in a similar fashion. If the bit error rate is less than a predetermined threshold, error-correction techniques can be used to correct errors, and privacy amplification can be used to reduce Eve's knowledge of the key to an arbitrarily small amount at the cost of reducing the length of the key. If the bit error rate is greater than a predetermined threshold, they abort the key and try again, possibly with a different quantum channel, as the security of the key cannot be guaranteed.

Note that, in addition to the presence of an eavesdropper, other environmental factors (e.g., quality of the quantum channel or transmitting/receiving equipment) may also introduce errors. For example, a channel with high loss may result in increased error rate. Without an accurate estimation of the environmentally induced error rate, a QKD scheme may not be able to produce a shared quantum string, because they are always being discarded. Certain existing system may require that the error rate to be less than 7% in order to produce a shared quantum string.

From the shared quantum string produced via QKD, Alice and Bob can further negotiate one or more quantum data keys, each quantum data key can include a subset of bits selected from the set of bits in the shared quantum string. Note that the quantum data keys are used as encryption keys in actual communications between Alice and Bob.

Trusted Computing

Trusted Computing is an emerging technology developed by the Trusted Computing Group (TCG) towards building trustworthy computer platforms. In trusted computing, the computer will consistently behave in expected ways, and those behaviors will be enforced by computer hardware and software. Enforcing this behavior is achieved by loading the hardware with a unique encryption key inaccessible to the rest of the system. According to the TCG, "trusted component, operation, or process is one whose behavior is predictable under almost any operating condition and which is highly resistant to subversion by application software, viruses, and a given level of physical interference."

The core of the trusted computing is the root of trust and the chain of trust. In trusted computing, the root of trust can be factory-installed hardware or firmware, such as the Trusted Platform Module (TPM). A TPM can be implemented as dedicated, cost-effective crypto-chips. A TPM can be physically connected to the computation platform and coupled to the CPU (central processing unit) via external buses. For example, the TPM on a personal computer (PC) can be mounted onto the main board of the PC and connected via a Low Pin Count (LPC) bus. In addition to storing the information for authenticating the platform, a TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

The chain of trust is the iterative means to extend the boundary from the root of trust. The trustworthiness of a currently running component is based on the trustworthiness of a previously running component. Starting from the root of trust (also known as the trust anchor), if each time the computational environment of the platform changes (e.g., the running of certain codes), the trust can be maintained, thus establishing a reliable chain of trust, the platform can be viewed as trustworthy by local and remote entities.

Trusted computing technologies can include trusted measurement, trusted reporting, trusted storage, and trusted networking. FIG. 1 illustrates the chain of trust in a PC as defined by the Trusted Computing Group. More specifically, FIG. 1 shows the chain of trust for measurement, reporting, storage, and logging.

In addition to TPMs, Trusted Platform Control Modules (TPCMs) have also been developed. TPM was a subordinate device and the root of trusted measurement was put into BIOS (as shown in FIG. 1), which faces the threat of being tampered with. TPCM incorporates into the module the root of trusted measurement, thus protecting the root and original point of measurement and modifying the boot and measurement sequence. Accordingly, a chain of trust can be established using the TPCM chip as the trust anchor, thus allowing the TPCM chip to control the boot, I/O, and provisioning of the system.

During the operation of the computing platform, the TPCM needs to ensure the integrity of the next level executable code before the system transfers control to the next level executable code. The control of the system continues to be transferred to subsequent levels of executable code, thus establishing the chain of trust. More specifically, the TPCM or the TPM can start the boot process from a trusted condition and extend this trust until the operating system has fully booted and applications are running.

Secure System Architecture

Figure 2:
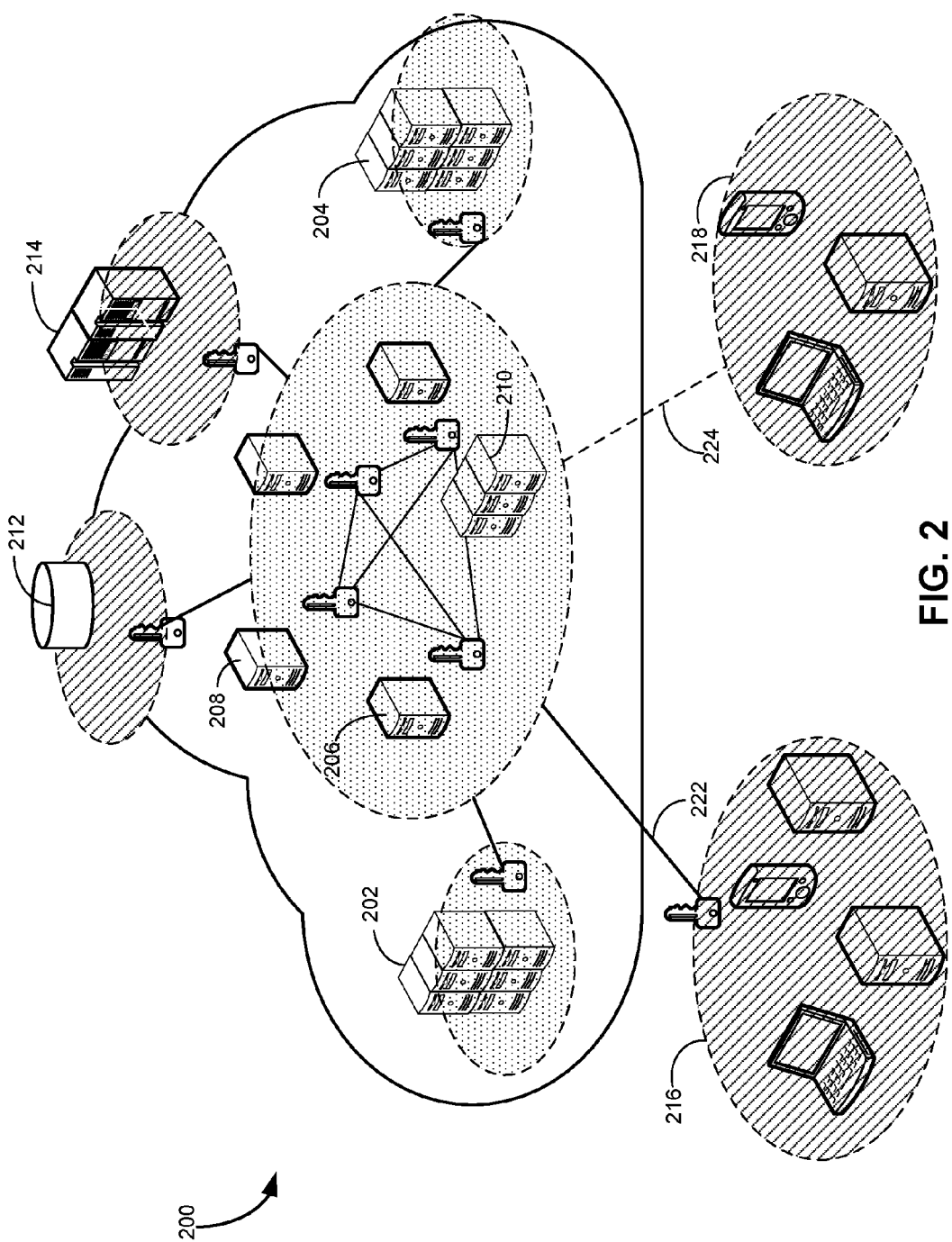
FIG. 2 illustrates the architecture of an exemplary secure cloud computing system based on quantum key distribution and trusted computing, according to one embodiment.

FIG. 2 illustrates the architecture of an exemplary secure cloud computing system based on quantum key distribution and trusted computing, according to one embodiment. A secure cloud computing system 200 can include a number of participating entities, such as the cloud provider and the cloud users. If the trusted certificate is issued by a third party certificate authority (CA), the CA will also be part of secure cloud computing system 200. A CA is not included in the example shown in FIG. 2.

The cloud provider is responsible for providing the cloud control platform and the various cloud infrastructures, including both hardware and software components. In the example shown in FIG. 2, the entire cloud computing system can be divided into two realms, the one controlled by the cloud provider (shown as the shaded area) and the one controlled by the cloud users (shown as the hatched area).

In some embodiments, trusted computing is implemented in both the cloud provider realm and the user realm. For example, equipment provided by the cloud provider, which can include servers (e.g., clusters of servers 202 and 204), cloud control nodes (e.g., nodes 206 and 208), and hardware security modules (HSMs) (e.g., pool of HSMs 210), can be equipped with modules that enforce trusted computing, such as TPMs. These TPMs can be implemented as hardware, firmware, and software modules. Moreover, user-controlled equipment, such as client machines, databases (e.g., database 212), and cloud-HSMs (e.g., pool of cloud-HSMs 214) can also be equipped with TPMs. Note that a cloud-HSM can refer to a dedicated HSM appliance owned or controlled by the customer but collocated in the cloud. The TPMs in the cloud and on the user machines ensure dynamic trust measurement and trusted storage.

In addition to trusted computing, QKD technologies can also be implemented in both the cloud provider realm and the user realm. More specifically, quantum key exchange can be enabled among the cloud nodes, as shown by the key logos. On the other hand, two types of user may exist: one group of users is equipped with QKD modules (e.g., user group 216), whereas the other group of users (e.g., user group 218) does not have the quantum key exchange capability. In the example shown in FIG. 2, communication channels that also include a quantum channel to enable QKD are shown in solid lines (e.g., communication channel 222), whereas communication channels that do not include a quantum channel are shown in dashed lines (e.g., communication channel 224). More specifically, on the QKD-enabled communication channels, communication partners can negotiate encryption keys (also referred to as quantum data keys) using the quantum channel and then use the negotiated keys for secure communication. For example, a user within user group 216 can communicate with the cloud servers using the quantum-enhanced secure channel. Moreover, the user can perform initial configuration of his cloud-HSM via the QKD-enabled communication channels. Similarly, nodes within the cloud (e.g., the cloud control nodes and the cloud servers) can also communicate with each other using negotiated quantum data keys. Details regarding the process of obtaining the quantum data keys will be discussed later. On the other hand, users within user group 218 can only communicate with the cloud servers using keys negotiated via conventional technologies.

In some embodiments, the cloud can include a trusted authorization center that is responsible for issuing trusted certificates and private keys to entities (or pieces of equipment) coupled to the cloud, including the cloud servers (e.g., server clusters 202 and 204 shown in FIG. 2) and client machines. In other words, the trusted authorization center functions as the CA for the cloud. The trusted authorization center can receive a trusted certificate and a corresponding private key from a third-party CA or it can generate the trusted certificate and private key using a TPM module associated with the trusted authorization center. Note that, prior to the CA issuing the trusted certificate and private key, the CA needs to authenticate the trusted authorization center and verifies its platform integrity. To distinguish from other private keys issued to other entities or equipment in the cloud, the trusted certificate and private key of the trusted authorization center can be referred to as the system certificate and system private key, respectively. On the other hand, a private key issued by the trusted authorization center to a piece of equipment can be referred to as the equipment private key.

In some embodiments, the trusted authorization center can respond to an authorization request (or initialization request) from an entity, and issue a trusted certificate and a private key to the requesting entity. The trusted certification and private key can be generated by the trusted authorization center based on the system private key and information provided by the requesting entity or piece of equipment (e.g., the requesting entity's identity as well as its platform information). Note that, for a trusted-computing-enabled entity, the platform information can include a unique identifier and platform configuration register (PCR) values associated with a module (e.g., a TPM module or a TPCM module) that enforced trusted computing on the entity.

Figure 3A:
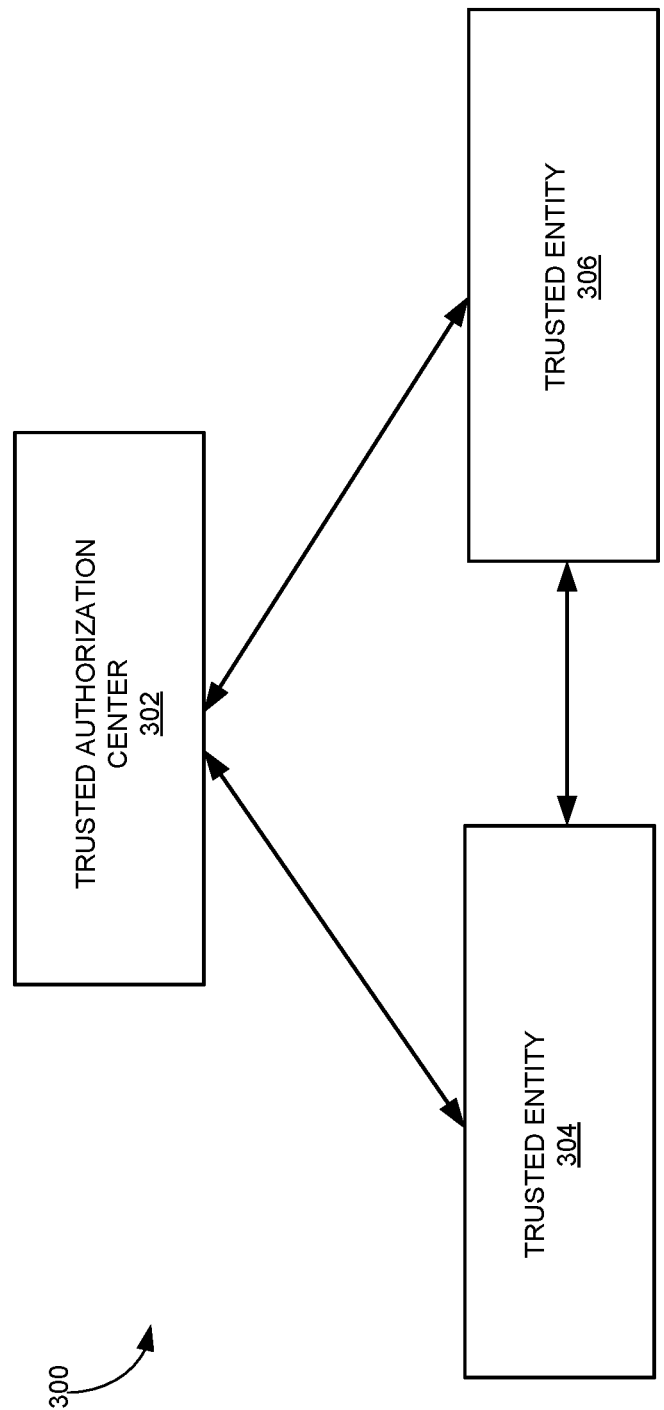
FIG. 3A illustrates a simplified diagram of a secure system, according to one embodiment.

FIG. 3A illustrates a simplified diagram of a secure system, according to one embodiment. Secure system 300 can include a trusted authorization center 302 and a number of trusted entities coupled to trusted authorization center 302 (e.g., trusted entities 304 and 306). The trusted authorization center may have a centralized control, where a single node (e.g., a standalone server) performs the function of maintaining the system private key, generating and distributing certificates and private keys to requesting equipment. Alternatively, the trusted authorization center may have a distributed control, where a plurality of control nodes share the authorization duty, thus further enhancing security, such as the security of the system private key as well as the security of the equipment private keys.

Figure 3B:
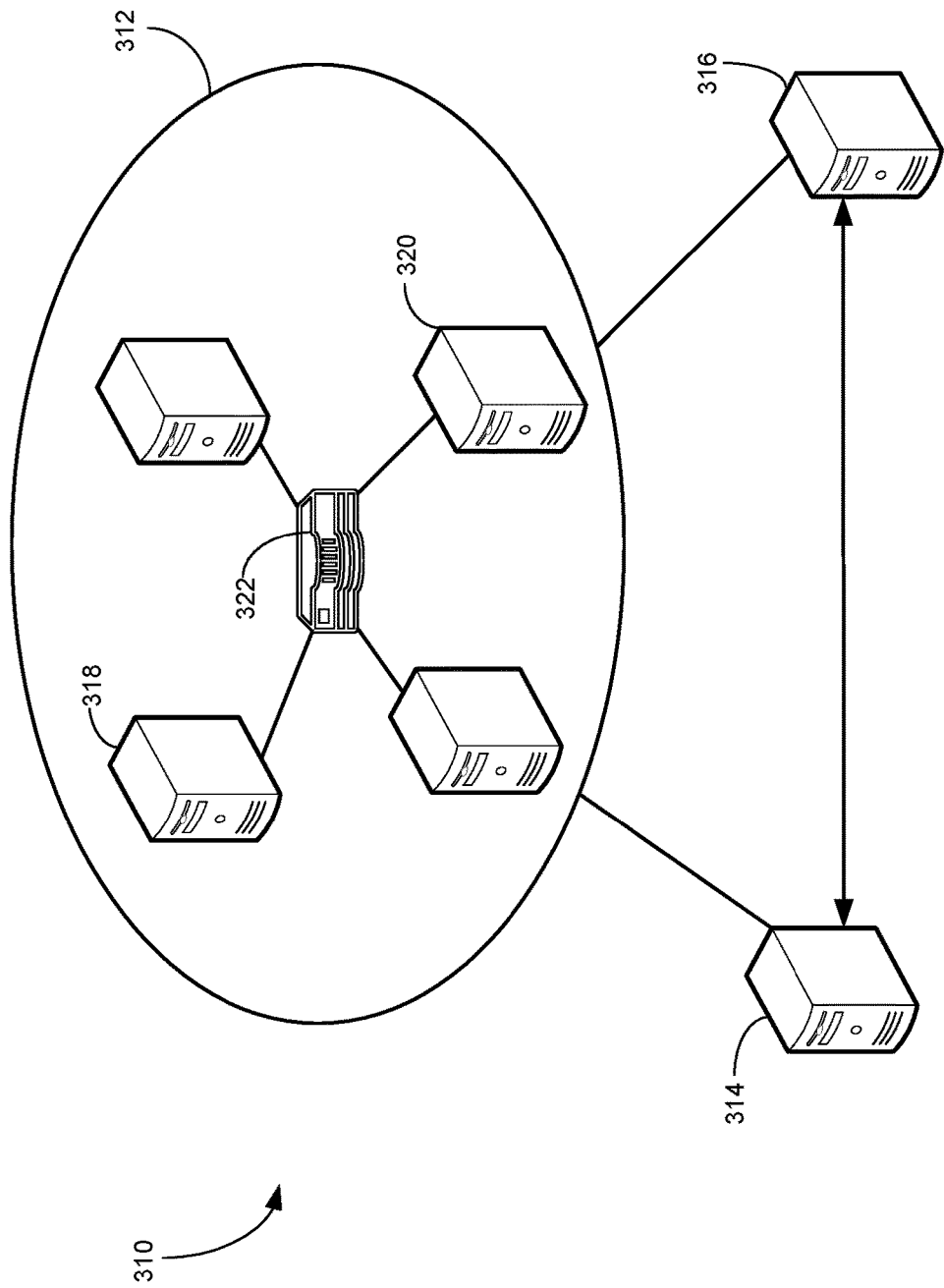
FIG. 3B illustrates a simplified diagram of a secure system with a distributed trusted authorization center, according to one embodiment.

In some embodiments, the trusted authorization center can include a plurality of trusted control nodes (e.g., nodes 206 and 208 shown in FIG. 2) that are coupled to each other. These control nodes collectively share and perform the authorization duty. FIG. 3B illustrates a simplified diagram of a secure system with a distributed trusted authorization center, according to one embodiment. Secure system 310 can include a trusted authorization center 312 and a number of trusted entities coupled to trusted authorization center 312 (e.g., trusted entities 314 and 316). Trusted authorization center 312 can include a number of control nodes (e.g., control nodes 318 and 320) that are interconnected to each other via a switch 322.

The multiple trusted control nodes within trusted authorization center 312 can share the system private key. To ensure secrecy of the system private key, in some embodiments, a (t, n) threshold secret-sharing scheme (a Shamir's scheme) is used to allow n control nodes to share the system private key generated by a master control node. Note that the (t, n) threshold secret-sharing scheme allows a secret to be divided into n shares and any t (or a number that is greater than t) out of n shares can be used to recover the secret. The master control node can be the most trustworthy node within trusted authorization center 312. If there are n control nodes within trusted authorization center 312, the system private key can be divided into n shares using the (t, n) threshold scheme, where t is less than or equal to n. The master control node can then distribute the (n−1) shares of the system private key among other n−1 control nodes. Each share of the system private key can also be referred to as the system subkey. As a result, each control node maintains a different system subkey or a different share of the system private key.

In response to receiving an authorization request, a control node can first verify the identity and platform integrity of the requesting equipment, and then generate an equipment subkey based on its share of the system private key and the identity and platform information associated with the requesting equipment. To further enhance security, the control node may also incorporate a timestamp value when generating the equipment subkey.

System Initialization

In some embodiments, initialization of the secure system can include the initialization of the trusted authorization center, which can include obtaining a trusted certificate and a private key. In some embodiments, the trusted authorization center can include a single entity, and the trusted certificate and the private key pair can be obtained from a third-party CA. Alternatively, the trusted authorization center can include multiple control nodes, which collectively manage and control the trusted authorization center.

Figure 4:
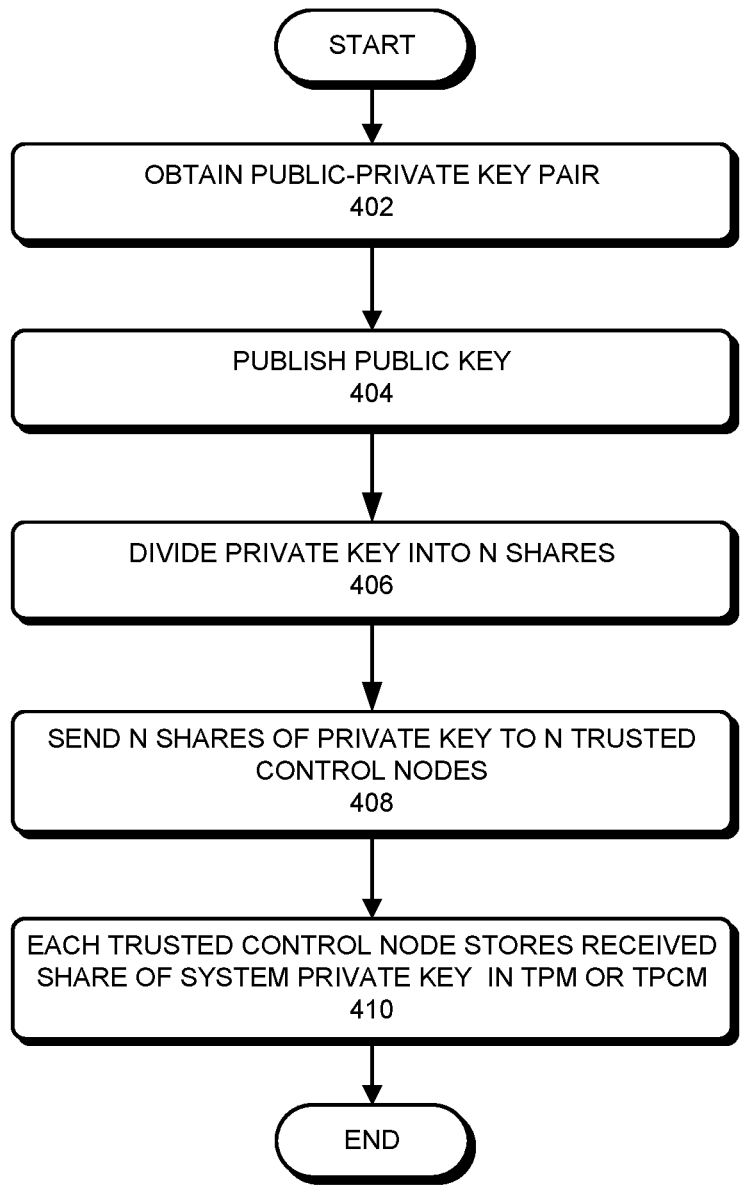
FIG. 4 presents a flowchart illustrating an exemplary initialization process of a distributed trusted authorization center, according to one embodiment.

FIG. 4 presents a flowchart illustrating an exemplary initialization process of a distributed trusted authorization center, according to one embodiment. During initialization, a public-private key pair associated with the trusted authorization center is obtained (operation 402). This public-private key pair can be obtained from a third-party CA or can be generated by a master trusted control node. For example, the system private S can be generated according to: $S = S_r \oplus (CA_{ID}|CAP_{ID}/\text{expire\_time})$, where $S_r$ can be a random number generated by a quantum noise source, $CA_{ID}$ can be the identifier assigned to the trusted authorization center, $CAP_{ID}$ can be the platform identifier, and expire_time can be the current timestamp. $CA_{ID}/CAP_{ID}/\text{expire\_time}$ can indicate a predetermined algorithm that can generate an output based on these three parameters.

Note that various criteria can be used to select the particular trusted control node, such as a level of trustworthiness. For example, a control node with the highest level of trustworthiness can be selected as the master trusted control node. Alternatively, the master trusted control node can be selected randomly. In some embodiments, the public-private key pair can be generated by the TPM or TPCM chip of the master trusted control node.

The public key of the public-private key pair is published (operation 404). More specifically, this public key can be published to all control nodes within the trusted authorization center. Additionally, other nodes in the cloud can also be notified of this public key. The private key (also known as the system private key) can then be divided into a number of shares using a secret-sharing scheme (e.g., the (t, n) threshold scheme) (operation 406). If there are n trusted control nodes within the trusted authorization center, the system private key can be divided into n shares, each share being noted as $S_i$ (i=1, 2, . . . , n). The n shares of the system private key can then be sent to the n trusted control nodes, one share per node (operation 408). In some embodiments, quantum-enhanced secure channels can be established among trusted control nodes via a QKD scheme. For example, any two trusted control nodes can exchange, via a QKD scheme, a symmetric key that can be used for encryption. The n shares of the system private key (or the n system subkeys) can be sent via the previously established quantum-enhanced secure channels. For example, a particular share of the system private key can be encrypted using the symmetric key before being sent to a receiving trusted control node. Alternatively, the master trusted control node may directly send a system subkey in form of qubits (i.e., being encoded using quantum states), and use redundant transmission and on-demand retransmission to ensure transmission reliability.

Each trusted control node can then store the received share of the system private key ($S_i$) in its TPM or TPCM chip (operation 410). Using FIG. 3B as an example, a master trusted control node (e.g., trusted control node 318) may divide the system private key, using the (t, n) threshold scheme, into four shares, store one share into its own TPM, and send the remaining three shares to three other trusted control nodes (e.g., control node 320) in trusted control center 312. To prevent loss of the system private key due to the master trusted control node being attacked or compromised, the master trusted control node may delete the system private key as well as the shares sent to other trusted control nodes.

An entity or piece of equipment can send an authorization request to the trusted authorization center, and in response, receive a trusted certificate and a corresponding private key (i.e., the equipment private key). The trusted certificate and the equipment private key can later be used for authentication purposes. If the trusted authorization center is a distributed system (e.g., if it includes a set of trusted control nodes), the entity may send the authorization request to a subset of the trusted control nodes.

Figure 5:
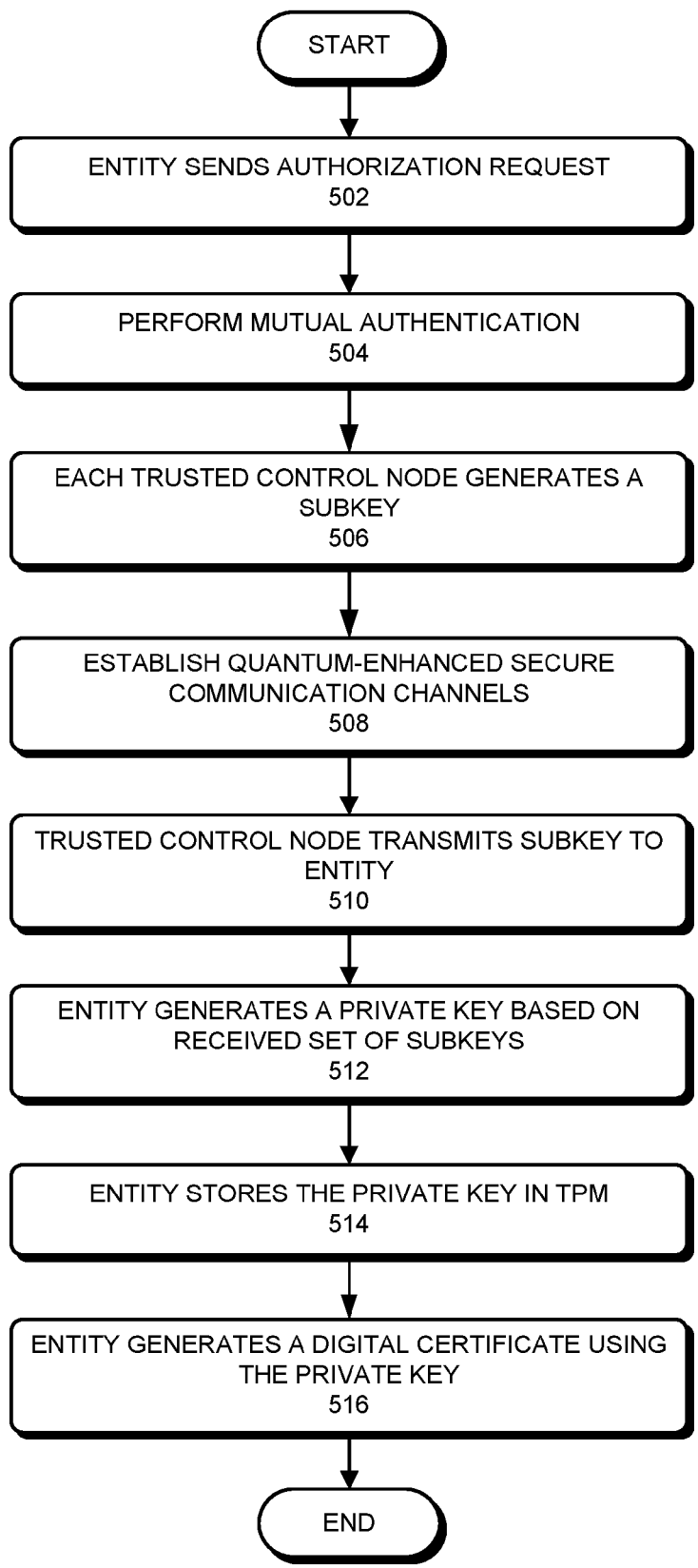
FIG. 5 presents a flowchart illustrating an exemplary process for issuing a trusted certificate and equipment private key, according to one embodiment.

FIG. 5 presents a flowchart illustrating an exemplary process for issuing a trusted certificate and equipment private key, according to one embodiment. During initialization, an entity sends an authorization request to a subset of trusted control nodes belonging to the trusted authorization center (operation 502) and performs mutual authentication with each trusted control node receiving the request (operation 504). The number of trusted control nodes in the subset depends on the secret-sharing scheme used for sharing the system private key. For example, if the (t, n) threshold scheme was used, the entity may send the authorization request to at least t trusted control nodes. The mutual authentication can be performed by exchanging digital certificates. More specifically, the entity can attach to its authorization request a digital certificate that is bound to its identity and its TPM. In response, the receiving trusted control node can also send to the trusted cloud server its own digital certificate, which is also bound to the identity and TPM of the trusted control node.

Subsequent to the mutual authentication, each trusted control node may generate a subkey (or equipment subkey) for the requesting entity (operation 506). More specifically, the subkey can be generated based on the identity and TPM information of the requesting entity. The TPM information can include the unique identifier of the TPM and the PCR values. Note that the PCR values can be used to extract the initial trusted measurement result of the trusted platform, and can later be used as a baseline for subsequent measurement of the trustworthiness of the platform. In some embodiments, other trusted control nodes can send the extracted initial trusted measurement result of the requesting entity to the master trusted control node, which can be responsible for maintaining a record of the initial trusted measurement result associated with the requesting entity.

A subkey generated by trusted control node r for entity u can be calculated as: $S_{ur}=S_{i_r}(u_{ID}/TPM_{ID}/\text{expire\_time})$, where $i=1, \ldots, n$; $r=1, \ldots, t$; and $i_r$ indicates any t nodes selected from the n nodes. For example, $i=3$ and $t=1$ can refer to a trusted control node selected from three control nodes, and $S_{i_r}$ can be the system subkey (or the share of the system private key) stored in the TPM of the requested trusted control node. Expire_time can be the value of a timestamp, $u_m$ can be calculated based on the identity of the requesting entity according to a certain algorithm, and $TPM_{ID}$ can be calculated based on the TPM information of the requesting entity according to a certain algorithm. If a TPCM is used instead of a TPM, $TPCM_{ID}$ can be used in the formula. $u_{ID}/TPM_{ID}/\text{expire\_time}$ can indicate a predetermined algorithm that can generate an output based on these three parameters. In addition to subkey $S_{ur}$, the requested trusted control node can also generate a sub-certificate for the requesting entity based on the subkey.

The requesting entity and the requested trusted control nodes can establish quantum-enhanced secure communication channels (operation 508), and the requested trusted control nodes can each transmit a subkey to the requesting entity (operation 510). Establishing the quantum-enhanced secure communication channel between the entity and the trusted control node can involve a QKD process (e.g., BB84), in which a symmetric key can be negotiated, and transmitting the subkey to the entity can involve encrypting the subkey using the negotiated symmetric key. Upon receiving the encrypted subkey, the requesting entity can decrypt it using the negotiated symmetric key.

Subsequent to receiving subkeys from the subset of trusted control nodes (e.g., the t trusted control nodes), the requesting entity can combine the subkeys to generate its own private key (operation 512). More specifically, by receiving t subkeys from the t trusted control node, the entity essentially obtains the coordinate of the t points, $(X_{i1}, S_{u1})$, $(X_{i2}, S_{u2}), \ldots, (X_{it}, S_{ut})$, and can then use Lagrange interpolation to obtain the original function $f(X)$. An equipment private key for entity u ($S_u$) can be calculate as $f(0)$. In some embodiments, $S_u$ can be calculated as:

$$S_u = \sum_{r=1}^{t}\left(\prod_{j\neq r, j=1}^{t} \frac{X-X_{i_j}}{X_{i_r}-X_{i_i}}\right) S_{i_r}(u_{ID}/TPM_{ID}/\text{expire\_time})$$

$$= \sum_{r=1}^{t}\left(\prod_{j\neq r, j=1}^{t} \frac{X-X_{i_j}}{X_{i_r}-X_{i_i}}\right) S_{ur},$$

where $X$ is the variable used in Lagrange interpolation, and can be set as being equal to 1, 2, 3, . . . .

The requesting entity can then store the equipment private key in its TPM (operation 514). The entity can generate a trusted certificate based on the equipment private key (operation 516). In some embodiments, if the requesting entity is a cloud client device, in addition to storing the equipment private key and trusted certificate into its TPM, it can also inject such information into the TPM of a remote trusted server or a trusted peripheral storage device. Alternatively, the client device can encrypt the equipment private key and trusted certificate using its own TPM and then store the encrypted information into a trusted storage device. Only the legitimate user of the cloud client device can have access to the TPM and the trusted storage device, thus ensuring the security of the equipment private key.

In the example shown in FIG. 5, the trusted authorization center is a distributed system. In principle, the operation process can be similar for a centralized trusted control center, except that the requesting entity only needs to send a single authorization request to the centralized trusted control center. The centralized authorization center can verify the identity and integrity of the requesting entity based on identity and platform information included in the authorization request. The identity information can include one or more of: the user identity, the equipment identity, and information associated with a particular thread or process running on the requesting entity. The platform information can include the unique identifier of the TPM (which can be implemented as hardware, firmware, and software) and the PCR values. The centralized trusted control center may verify the identity of the requesting entity by comparing it to a white list or by inquiring equipment manufacturers.

Subsequent to verifying the identity and integrity of the requesting entity, the centralized authorization center can compute an entity ID ($u_m$) based on the identity information, a platform ID ($PTM_{ID}$) based on the platform information, and combine $u_{ID}$ and $PTM_{ID}$ using a predetermined algorithm. The centralized authorization center can then use the combined ID and the system private key as input to generate, using a predetermined private-key-generation algorithm, an equipment private key. To enhance security, generation of the equipment private key can also include, as an input, the value of the current timestamp, thus producing a private key that dynamically changes with time. In some embodiments, the calculation of the equipment private key can be expressed as: $S_u=u_{ID}/TPM_{ID}/expire\_time$, where $u_{ID}/TPM_{ID}/expire\_time$ can indicate a predetermined algorithm that can generate an output based on these three parameters.

Trusted-Computing Based Quantum Key Negotiation

Subsequent to system initialization, i.e., subsequent to entities receiving equipment private keys and trusted certificates, entities may start to establish secure communication channels among themselves. In some embodiments, two entities can produce one or more shared quantum data keys using a trusted-computing based QKD scheme. One can assume that two communicating entities have previously negotiated a shared secret quantum string. Each entity can store the shared secret quantum string in its TPM. For example, an entity can generate a trusted storage key using the TPM storage root key, encrypt the shared secret quantum string using the TPM storage root key, and store the encrypted string in the TPM. After mutual authentication, the two entities can negotiate the length and starting bit position of a quantum data key to allow these two entities to produce the quantum data key from the stored secret quantum string.

In some embodiments, multiple quantum data keys can be produced from the same shared secret quantum string, thus enhancing the key-generation efficiency.

In some embodiments, the multiple quantum data keys may have the same length and are continuously extracted from the secret quantum string. For example, a first entity may communicate to a second entity a number of key-generation parameters, including the number of keys (m), their length (l), and a starting bit position (i). This means that the m quantum data keys will include bits starting from bit position i within the shared secret quantum string and ending at bit position i+m·l−1. Note that, if the total number of bits in the shared secret quantum string is n, then the key-generation parameters can be constrained by m·l<(n−i).

Table 2 shows an exemplary shared secret quantum string, according to one embodiment.

TABLE 2

A Quantum String

| Bit Position | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| Bit value | | | | | | | | | | | | | | | |
| 0 | 1 | 1 | 1 | 0 | 1 | 0 | 1 | 1 | 0 | 1 | 0 | 1 | 1 | 0 | 0 |

Using the shared secret quantum string shown in Table 2 as an example, if the key-generation parameters {l,m,i} are set as {8,2,1}, meaning that two 8-bit keys are generated, starting from bit position 1. As a result, the two generated quantum data keys will be: 01110101 and 10101100. As one can see, using this continuous approach, the number of quantum data keys is limited by the total length of the secret quantum string.

It is also possible to generate quantum data keys of different lengths. In some embodiments, a pair of key-generation parameters ({l, i}) can be used to define a quantum data key, where l is its length and i is the starting bit position. The first entity can send k pairs of key-generation parameters, $\{l_1, i_2\}, \{l_2, i_2\}, \ldots, \{l_k, i_k\}$, which can be used to generate k quantum data keys. Using the shared secret quantum string shown in Table 2 as an example, if the first entity sends two pairs of key-generation parameters: {10,1},{3,12}, meaning that the first key has 10 bits, starting from bit 0, and the second key has 3 bits, starting from bit 12. Accordingly, the two quantum data keys generated from the secret quantum string shown in Table 2 will be: 0111010110 and 011. It is also possible for the generated quantum data keys to partially overlap. As a result, the total number of bits included in the generated quantum data keys can be more than the number of bits included in the shared secret quantum string. For example, if the key-generation parameters are {10,1},{6,3},{9,8}, then the negotiated quantum data keys can be: 0111010110, 110101, and 110101100. The total number of bits of the three quantum data keys is 25, much larger than the length of the secret quantum string shown in Table 2. As discussed earlier, this approach can significantly increase the key-generation efficiency. Compared to the conventional QKD scheme, such as BB84, whose key-generation efficiency is limited by the error rate, this approach has the potential of producing a large number of quantum data keys to meet the demand of cloud computing. Alternatively, the key-generation parameters can be set as: $\{l_1, 1, i_1\}, \{l_2, 2, i_2\}, \ldots, \{l_k, k, i_k\}$, where k is the key-sequence number.

Alternatively, the quantum data keys can be continuously extracted from the secret quantum string, and the key-generation parameters only need to include the starting bit position of each quantum data key. In other words, if the starting bit position of the k-th key immediately follows the ending bit position of the (k−1)-th key, the key-generation parameters can be: $\{i_1\},\{i_2\}, \ldots, \{i_k\}$. Using the shared secret quantum string shown in Table 2 as an example, if the first entity sends three sets of key-generation parameters: {1},{5},{14}, then the generated quantum data key will be 0111, 010110101, and 100.

Other types of key-generation parameters can also be possible, as long as the communicating entities can use the parameters to extract, following predetermined rules, certain bits from the secret quantum strings to construct one or more quantum data keys.

To ensure security, the key-generation parameters can be transmitted in encrypted form. For example, the first entity may encrypt, using the second entity's public key, the key-generation parameters before transmitting. Upon receiving, the second entity can use the corresponding equipment private key to decrypt and obtain the parameters. Alternatively, the key-generation parameters can be encrypted using a previously generated quantum data key. More specifically, the public key can be used to encrypt the key-generation parameters during the initial key-negotiation process, whereas subsequent key-negotiation processes can use the most recently generated quantum data key to encrypt to-be-transmitted key-generation parameters. If multiple quantum data keys were generated in the most recent event, then the last quantum data key will be used for encrypting the key-generation parameters.

To further enhance key-negotiation security, the first entity may calculate and transmit a hash function to the second entity based on the key-generation parameters and a shared secret string, which can be a previously negotiated quantum data key or the equipment private key. In addition, to validate the identity and integrity of the second entity, the second entity may include, in its response, a message encrypted using the first entity's public key. The message can also include a predetermined variation of one or more key-generation parameters. For example, the message can include (m−1), where m is the number of keys. Alternatively, the message can include information derived from the values of l and/or i. The first entity can then validate the second entity by decrypting, using the first entity's private key, the received message, perform the predetermined variation, and compare the result with the original key-generation parameters. If the result matches, the second entity's identity can be validated. Alternatively, the second entity can encrypt the message using a previously negotiated quantum data key.

Figure 6:
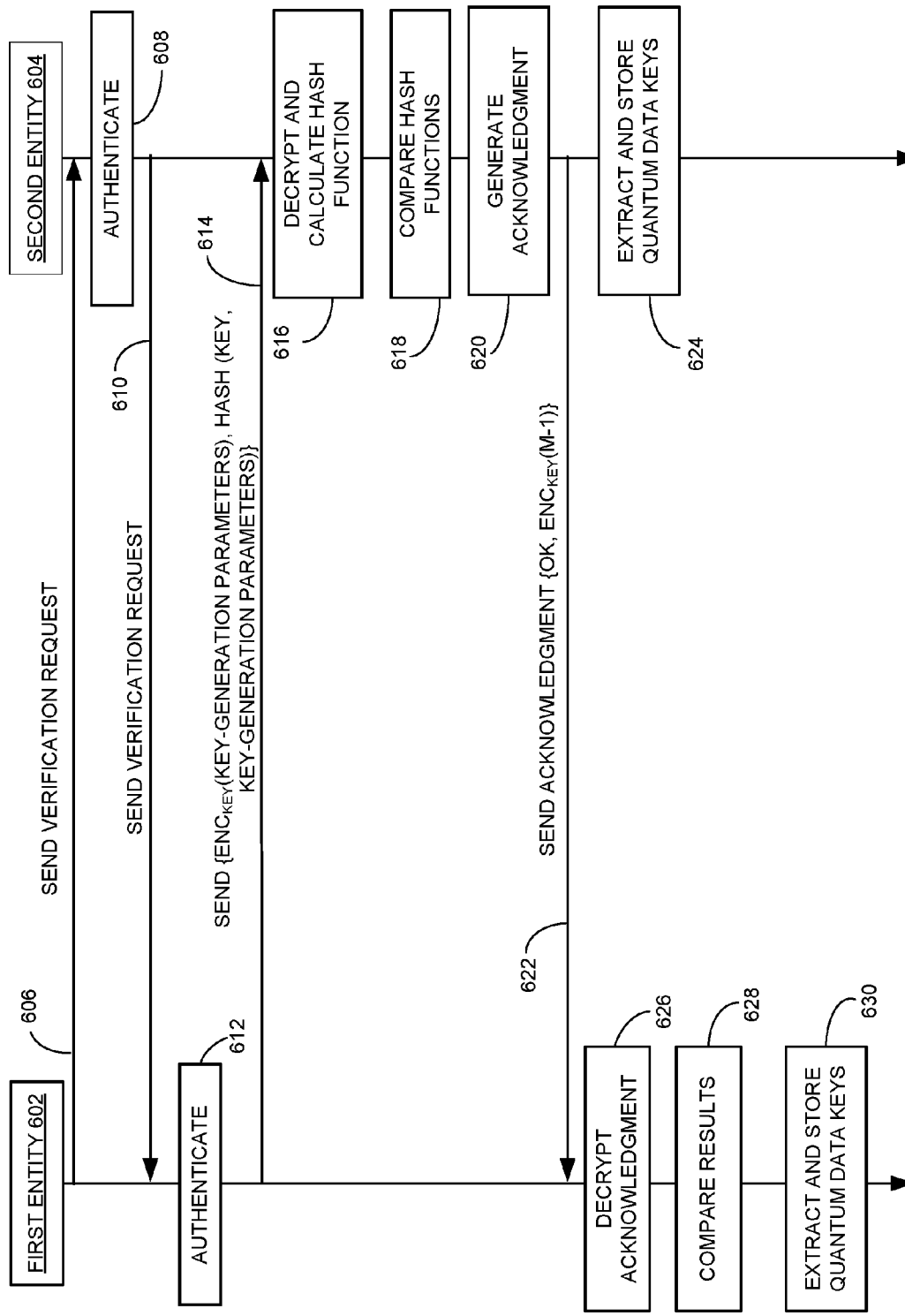
FIG. 6 presents a time-state diagram describing the process of producing shared quantum data keys, according to one embodiment.

FIG. 6 presents a time-state diagram describing the process of producing shared quantum data keys, according to one embodiment. Note that a quantum data key is different from a secret quantum string. A secret quantum string can include raw data bits obtained via a QKD process. A quantum data key can include certain bits within the secret quantum string, and positions of the bits can be negotiated between communication parties. The quantum data key typically is a subset of the secret quantum string, although it is possible for the entire secret quantum string to be used as a quantum data key. It is assumed that, before the current key negotiation process, the communication entities have previously negotiated, using a conventional QKD process (e.g., BB84 or E91), a secret quantum string. Each party can store the secret quantum string in its TPM or in a trusted storage.

During operation, a first entity 602 sends a verification request to a second entity 604 (operation 606). The request can include a trusted certificate issued by the trusted authorization center and a trusted measurement report. The trusted measurement report includes the measurement result of the platform states of the trusted platform. More specifically, it can use various mechanisms, including certificate, completeness, and security assertion, to measure the trustworthiness of the trusted computing platform of entity 602. Second entity 604 authenticates first entity 602 based on both the trusted certificate and the trusted measurement report (operation 608). Note that, because the trusted certificate of first entity 602 is issued by the trusted authorization center, second entity 604 can assume its trustworthiness. Moreover, second entity 604 may also obtain identity and platform information included in the trusted certificate by decrypting, using the system public key, the trusted certificate, and then compare the identity and platform information against a white list to verify the trustworthiness of first entity 602.

In addition to identity verification, second entity 604 may also determine the platform integrity of first entity 602 based on the trusted measurement report included in the verification request. For example, the received trusted measurement report can be compared against the initial report of first entity 602 stored in the trusted authorization center. To do so, second entity 604 may send the trusted measurement report of first entity 602 to the trusted authorization center, which then compares the received report with the initial report and sends a judgment result regarding the trustworthiness of first entity 602 to second entity 604. Alternatively, the trusted authorization center (or a master control node within a distributed system) can send the initial report to second entity 604, and second entity 604 can compare the received report with the initial report to determine whether first entity 602 remains trusted. For example, if the received trusted measurement report shows that certain platform states deviate from the platform states in the initial report, it may indicate that the platform may have executed certain illegally modified codes and can no longer be trusted. As a result, second entity 604 can terminate the process by discarding or ignoring the verification request from first entity 602. By examining the trusted measurement report of first entity 602, one can ensure dynamic verification of platform integrity, thus enabling a more accurate verification outcome.

In response to authenticating first entity 602, second entity 604 can then send a verification request to first entity 602 (operation 610). The verification request can include the certificate issued by the trusted authorization center and a trusted measurement report of second entity 604, which reflects the trustworthiness of second entity 604. Upon receiving the request, first entity 602 authenticates second entity 604 based on both the trusted certificate and the trusted measurement (operation 612). Operation 612 can be similar to operation 608. If authentication fails, first entity 602 can also terminate the process.

Subsequent to the mutual authentication, first entity 602 defines a set of key-generation parameters, encrypts the key-generation parameters using the public key of second entity 604, calculates a hash function of the key and the key-generation parameters, and then transmits the encrypted key-generation parameters and hash function to second entity 604 (operation 614). For example, if the keys are of equal length, and the key-generation parameters are marked as $\{l,m,i\}$, then the message sent from first entity 602 to second entity 604 can be: $\{ENC_{key}(l,m,i), hash(key,l,m,i)\}$, where $ENC_{key}(l,m,i)$ means encrypting (e.g., using the public key of the second entity or a predetermined quantum data key) the key-generation parameters $\{l,m,i\}$, and $hash(key,l,m,i)$ means a hash function calculated based on the encryption key and the key-generation parameters. On the other hand, if the keys are of different lengths, and key-generation parameters of a particular key are marked as $\{l_k, i_k\}$ or $\{l_k, k, i_k\}$, a message sent from first entity 602 to second entity 604 can be: message sent from first entity 602 to second entity 604 can be: $\{ENC_{key}(l_k,k,i_k), hash(key,l_k,k,i_k)\}$. Multiple messages can be sent from first entity 602 to second entity 604, one for each generated key. Alternatively, the multiple set of key-generation parameters for the multiple keys can be encrypted as one message and a single hash function can be calculated.

Upon receiving the message, the second unit can decrypt, using the second entity's private key or the predetermined quantum data key, the encrypted message to obtain the key-generation parameters. Moreover, the second entity can calculate the hash function based on the key (e.g., the second entity's public key) and the obtained key-generation parameters (operation 616), and compare the calculated hash function with the received hash function (operation 618). A matching result can validate the identity of the first entity and the completeness of the key-generation parameters. Subsequent to validating the first entity and the key-generation parameters, the second entity can generate an acknowledgment message (operation 620). In order to generate the acknowledgment message, the second entity can calculate, according to a predetermined rule, a variation of the obtained key-variation parameters and encrypt the calculated result. For example, the second entity can calculate m−1 or l+1, and encrypt the calculated result to obtain $ENC_{key}(m-1)$ or $ENC_{key}(l-1)$. The encryption key can be the first entity's public key or the predetermined quantum data key. The second entity can then send the acknowledgment message to the first entity (operation 622), and extract, from the shared secret quantum string, the quantum data keys based on the key-generation parameters and store the extracted quantum data keys in its TPM or a trusted storage (operation 624). More specifically, prior to storing the extracted quantum data keys in the trusted storage, the second entity may encrypt the extracted quantum data keys using an encryption key generated by its TPM.

Upon receiving the acknowledgment message, the first entity can then decrypt, using the first entity's private key or the predetermined quantum data key, the message (operation 626), and compare the decrypt result with its own calculation of the varied key-variation parameter (operation 628). A matching result can validate the second entity. Subsequent to validating the second entity, the first entity can extract, from the shared secret quantum string, the quantum data keys based on the key-generation parameters and store the extracted quantum data keys in its TPM or a trusted storage (operation 630). More specifically, prior to storing the extracted quantum data keys in the trusted storage, the second entity may encrypt the extracted quantum data keys using an encryption key generated by its TPM.

As one can see from the example shown in FIG. 6, each key-negotiation process can produce multiple quantum data keys, thus making this key-negotiation scheme suitable for use in the cloud computing setting, which often requires a large number of keys to be used among cloud servers or between cloud clients and cloud servers. For example, the first entity and the second entity shown in FIG. 6 can be a cloud server device (e.g., a server in server cluster 202 or 204 shown in FIG. 2) or a cloud client device (e.g., a client device in user group 216 shown in FIG. 2). If a cloud client device is not QKD-enabled, it can lease, from the cloud service provider, QKD equipment in order to participate the key negotiation.

Figure 7:
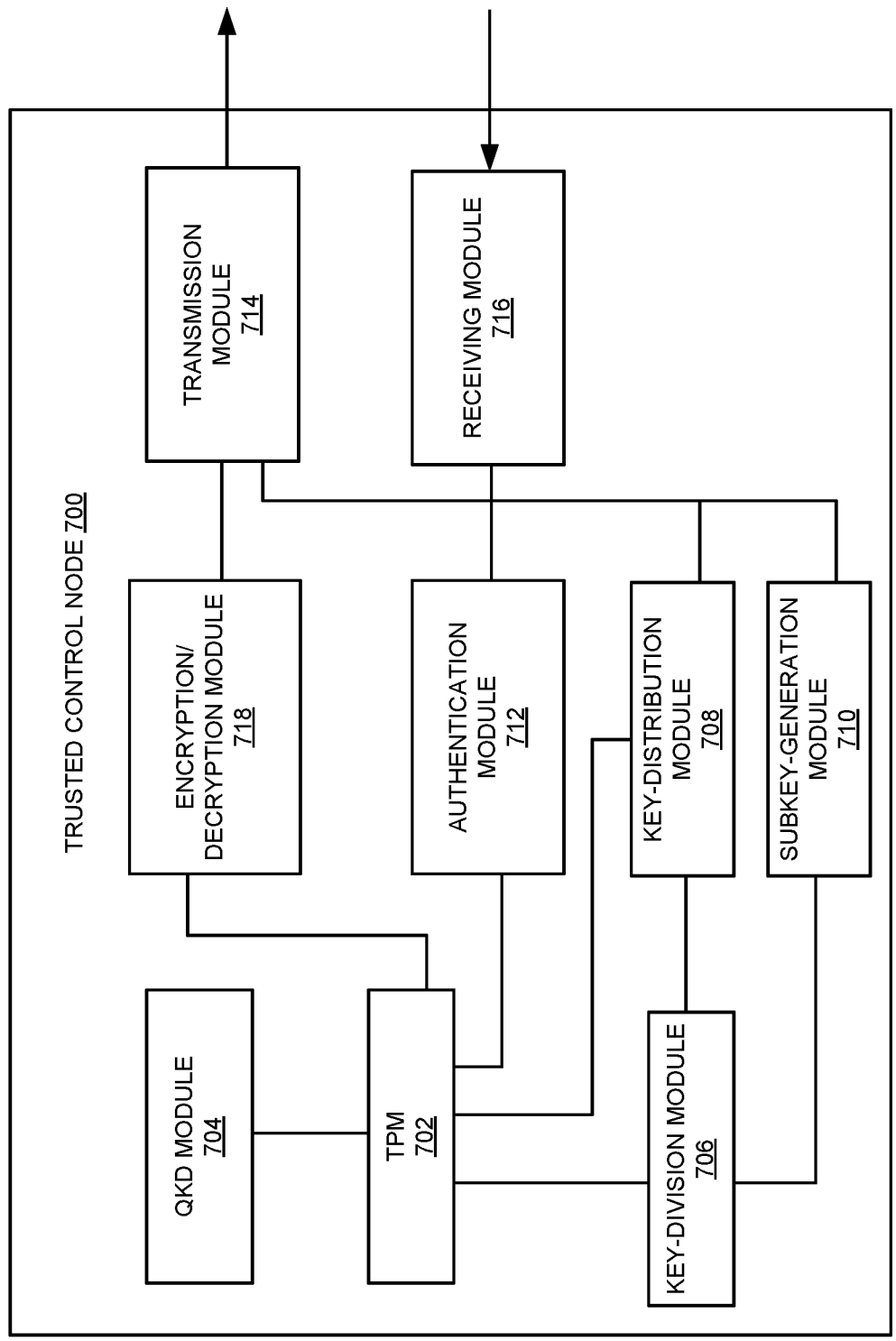
FIG. 7 illustrates a block diagram of a trusted control node within the trusted authorization center, according to one embodiment.

FIG. 7 illustrates a block diagram of a trusted control node within the trusted authorization center, according to one embodiment. Without the loss of generality, trusted control node 700 can be the master trusted control node. Trusted control node 700 can include a TPM 702, a QKD module 704, a key-division module 706, a key-distribution module 708, a subkey-generation module 710, an authentication module 712, a transmission module 714, a receiving module 716, and an encryption/decryption module 718.

TPM 702 can provide various trusted computing functionalities, including storing and generating keys and/or certificates, and monitoring the platform status. Moreover, TPM 702 can be responsible for generating the system private key. QKD module 704 can be responsible for negotiating a secret quantum string with a communication party (e.g., a peer trusted control node or an entity requesting authorization) over a quantum channel. The negotiated secret quantum string can be stored in TPM 702.

Key-division module 706 can be responsible for dividing the system private key into a number of shares based on a secret-share algorithm, such as the (t, n) threshold secret-sharing scheme. Key-distribution module 708 can be responsible for distributing the different shares of the system private key to other peer trusted control nodes. A particular share of the system private key can also be stored in TPM 702.

Subkey-generation module 710 can be responsible for generating a subkey in response to receiving an authorization request from a trusted entity. More specifically, the subkey can be generated based on the share of the system private key stored in TPM 702, a timestamp value, and the identity and platform information (e.g., the unique identifier and PCR values of the TPM) associated with the requesting trusted entity. In some embodiments, subkey-generation module 710 can be part of TPM 702. Authentication module 712 can be responsible for authenticating a communication partner, such as a peer trusted control node or an entity (e.g., a cloud server or a cloud client) requesting authorization.

Transmission module 714 and receiving module 716 can be responsible for transmitting messages to and receiving messages from a communication partner, respectively. The communication partner can be a trusted entity or a peer trusted control node. To facilitate QKD, transmission module 714 or receiving module 716 can also be coupled to a quantum channel. Encryption/decryption module 718 can be responsible for encrypting to-be-sent messaging and decrypting received messages during secure communication sessions.

Figure 8:
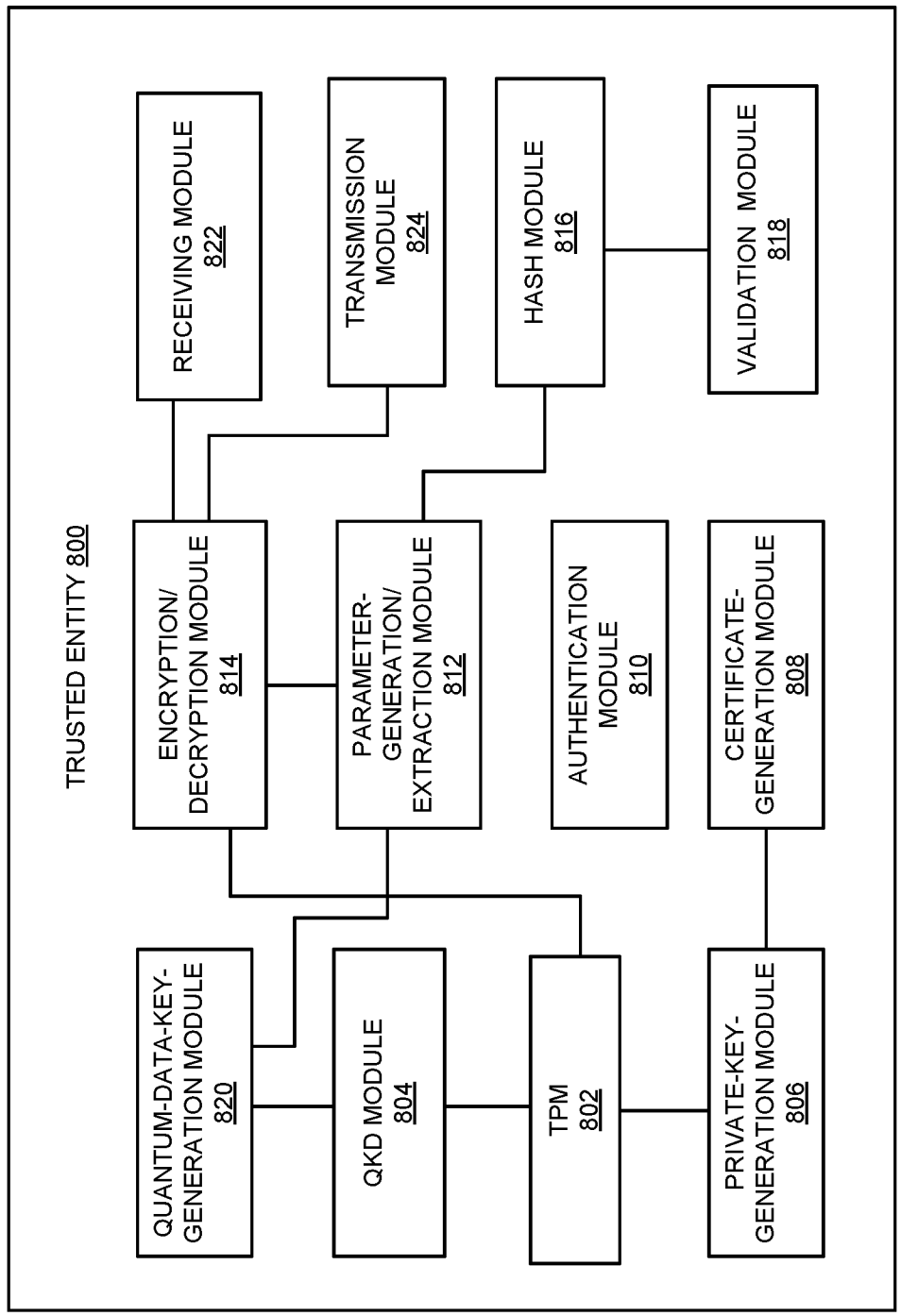
FIG. 8 illustrates a block diagram of a trusted entity, according to one embodiment.

FIG. 8 illustrates a block diagram of a trusted entity, according to one embodiment. Trusted entity 800 can include a TPM 802, a QKD module 804, a private-key-generation module 806, a certificate-generation module 808, an authentication module 810, a parameter-generation/extraction module 812, an encryption/decryption module 814, a hash module 816, a validation module 818, a quantum-data-key-generation module 820, a receiving module 822, and a transmission module 824.

TPM module 802 can be similar to TPM module 702 shown in FIG. 7. QKD module 804 can be responsible for negotiating a shared secret quantum string with a communication partner (e.g., a trusted control node in the trusted authorization center or a different entity). In some embodiments, QKD module 804 can store the negotiated shared secret quantum string in TPM module 802 or a trusted storage device controlled by trusted entity 800.

Private-key-generation module 806 can be responsible for generating an equipment private key based on a set of subkeys received from a subset of trusted control nodes within the trusted authorization center. Certificate-generation module 808 can generate a trusted certificate based on the equipment private key. In some embodiments, private-key-generation module 806 and certification-generation module 808 can be part of TPM 802.

Authentication module 810 can be responsible for authenticating a communication partner, which can be a trusted control node or a different entity. In some embodiments, authentication module 810 authenticates the communication partner not only based on the received trusted certificate but also based on a received trusted measurement report of the communication partner.

Parameter-generation/extraction module 812 can be responsible for generating or extracting key-generation parameters during the negotiation process of one or more quantum data keys. The generated parameters can be encrypted by encryption/decryption module 814 before being sent to a communication partner. Similarly, to extract received key-generation parameters, encryption/decryption module 814 needs to decrypt a received message.

Hash module 816 can be responsible for calculating a hash function. In some embodiments, hash module 816 can calculate a hash function based on a predetermined variation of one or more key-generation parameters and a shared secret (e.g., a secret key).

Validation module 818 can be responsible for validating the communication partners based on a received hash function and a calculated hash function.

Quantum-data-key-generation module 820 can be responsible for generating one or more quantum data keys based on the shared secret quantum string and the key-generation parameters. For example, the key-generation parameters may specify the number of quantum data keys, the length of each key, and the starting bit position in the shared secret quantum string for each key.

Transmission module 824 and receiving module 822 can be responsible for transmitting messages to and receiving messages from a communication partner, respectively. The communication partner can be a piece of equipment belonging to the cloud provider (e.g., a cloud server) or a piece of equipment belonging to the cloud user (e.g., a cloud client).

To facilitate QKD, transmission module 824 or receiving module 822 can also be coupled to a quantum channel.

In general, embodiments disclosed herein provide a solution to the technical problem of ensuring key-distribution security and efficiency. More specifically, various entities within the system can be equipped with hardware, firmware, or software devices that can enforce rules for trusted computing and devices that can enable quantum key exchange. The combination of trusted computing and QKD strengthens the key exchange security. More specifically, QKD can provide a shared secret quantum string, which can be inherently secure but not suitable for large-scale application. In addition, trusted computing technology can provide security assurance regarding the authenticity of the identities of communication parties, and can provide dynamic runtime monitoring of computing environment and behaviors. By defining and exchanging key-generation parameters within the trusted environment, multiple keys can be generated from the same quantum string, thus significantly increasing the key-generation efficiency.

The operating processes and system diagrams shown in FIGS. 4-8 are for exemplary purposes only. The various entities in the secure system may perform different operations and have different structures, as long as they are able to accomplish exchange of certain keys via a QKD scheme and enforce some or all of the trusted computing rules.

Figure 9:
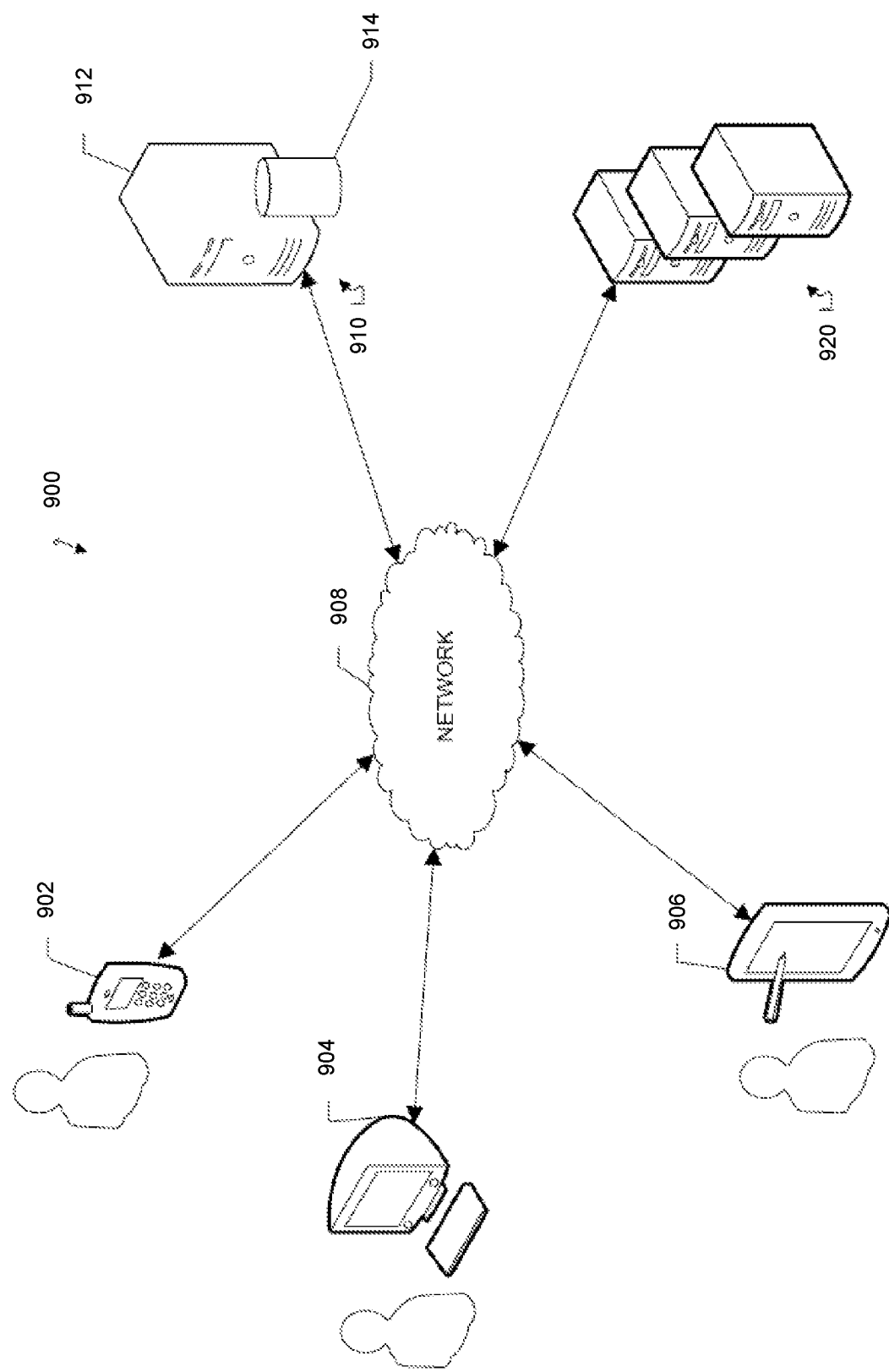
FIG. 9 illustrates an exemplary client-server network environment for implementing the disclosed eavesdropping-detection technology, in accordance with some embodiments described herein.

FIG. 9 illustrates an exemplary client-server network environment for implementing the disclosed eavesdropping-detection technology, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a smartphone, electronic device 904 is depicted as a desktop computer, and electronic device 906 is depicted as a PDA.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910 either alone or in combination with server 910. Each of the one or more remote servers 920 may host various services. For example, servers 920 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 910 may further maintain or be in communication with social networking services hosted on one or more remote servers 920. The one or more social networking services may provide various services and may enable users to create a profile and associate themselves with other users at a remote social networking service. The server 910 and/or the one or more remote servers 920 may further facilitate the generation and maintenance of a social graph including the user-created associations. The social graphs may include, for example, a list of all users of the remote social networking service and their associations with other users of a remote social networking service.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system and the one or more social networking services through a web-based browser application at the electronic devices 902, 904, 906. Communication among client devices 902, 904, 906 and the system, and/or one or more services, may be facilitated through a network (e.g., network 908).

Communications among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies, including a bus network, a star network, a ring network, a mesh network, a star-bus network, a tree or hierarchical network, and the like.

Figure 10:
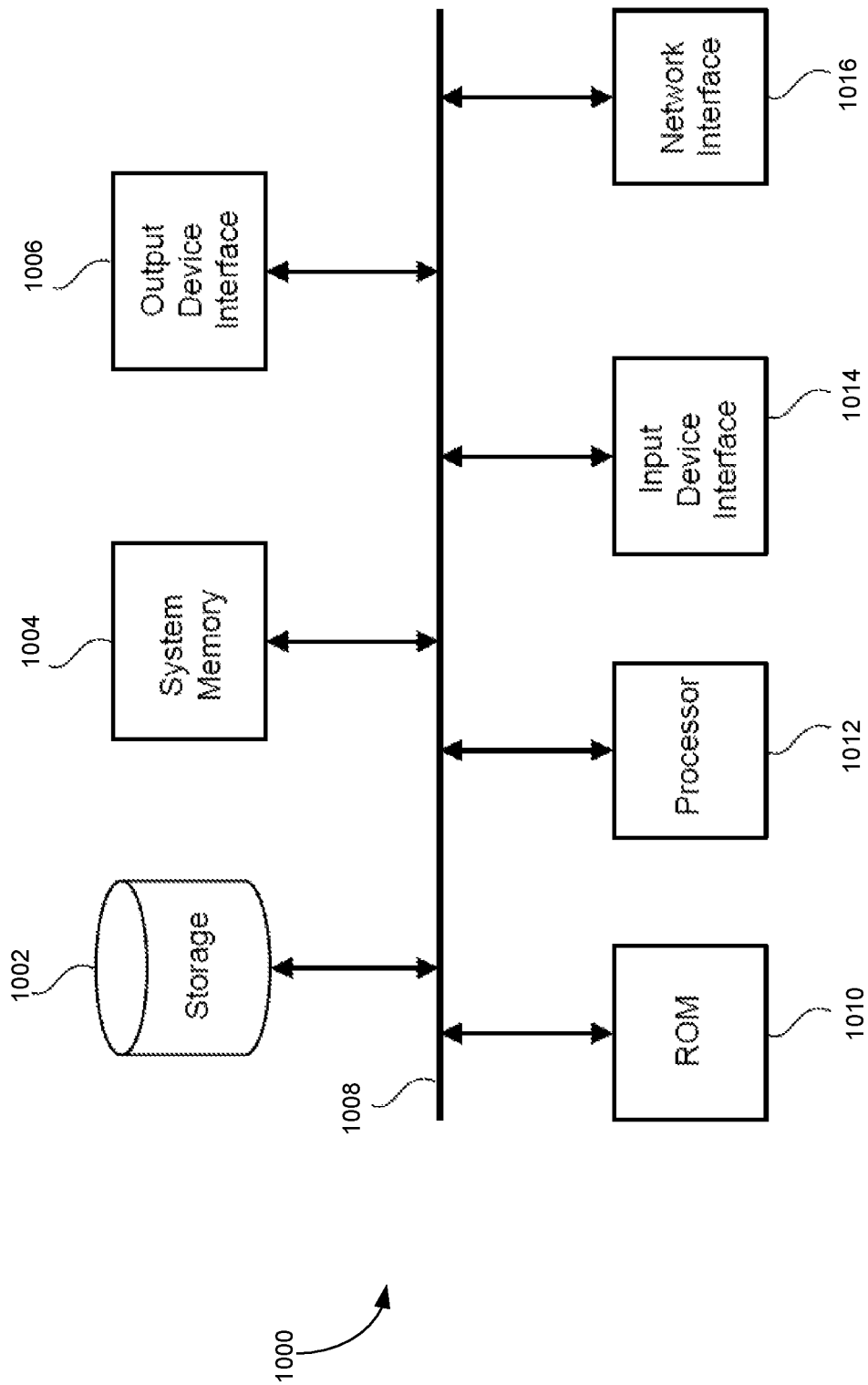
FIG. 10 conceptually illustrates an electronic system with which some implementations of the subject technology are implemented.

FIG. 10 conceptually illustrates an electronic system with which some implementations of the subject technology are implemented. Electronic system 1000 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of electronic system 1000. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interface 1006 enables, for example, the display of images generated by electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for negotiating quantum data keys between first and second entities, the method comprising:
   performing a mutual authentication between the first and second entities;
   in response to the mutual authentication succeeding, receiving, by the first entity, one or more sets of key-generation parameters from the second entity;
   in response to validating the sets of key-generation parameters, sending an acknowledgment message to the second entity;
   extracting, from a quantum string shared between the first and second entities, one or more quantum data keys based on the key-generation parameters, wherein a respective quantum data key comprises a number of bits extracted from the quantum string; and
   establishing a quantum-enhanced secure communication channel between the first and second entities.

2. The computer-implemented method of claim 1, wherein the first and second entities are each equipped with a trusted-computing module, and wherein performing the mutual authentication comprises exchanging a trusted measurement report associated with each of the first and second entities.

3. The computer-implemented method of claim 2, further comprising storing the extracted quantum data keys within the trusted-computing module.

4. The computer-implemented method of claim 1, wherein the quantum string shared between the first and second entities is obtained via a quantum key distribution (QKD) process.

5. The computer-implemented method of claim 1, wherein a respective set of key-generation parameters specifies a plurality of keys having a same length, and wherein the set of key-generation parameters comprises:

a number parameter specifying a number of keys to be generated;

a length parameter specifying a bit length of the to-be-generated keys; and a position parameter specifying a starting position of an initial to-be-generated key within the quantum string shared between the first and second entities.

6. The computer-implemented method of claim 1, wherein a respective set of key-generation parameters specifies a single to-be-generated key, and wherein the set of key-generation parameters indicates the length of the single to-be-generated key and the starting position of the single to-be-generated key.

7. The computer-implemented method of claim 6, wherein the lengths and starting positions of at least two keys are specified such that the two keys partially overlap, thereby resulting in a total number of bits in the extracted quantum data keys being more than a total number of bits in the quantum string shared between the first and second entities.

8. The computer-implemented method of claim 1, wherein while receiving the one or more sets of key-generation parameters, the first entity is configured to receive a hash function calculated by the second entity based on the key-generation parameters and a shared secret; and wherein validating the sets of key-generation parameters comprises comparing the received hash function with a hash function calculated by the first entity.

9. The computer-implemented method of claim 1, wherein sending the acknowledgment message comprises:

calculating a variation of at least one key-generation parameter;

encrypting, using an encryption key, the calculated variation to obtain an encrypted message; and sending the encrypted message.

10. The computer-implemented method of claim 1, wherein the received one or more sets of key-generation parameters are encrypted using an encryption key associated with the first entity.

11. The computer-implemented method of claim 1, wherein the first and second entities belong to a cloud computing system, and wherein the first or second entity comprises one of:

a piece of equipment provided by a cloud provider; and a piece of equipment provided by a cloud client.

12. The computer-implemented method of claim 11, wherein the first and second entities each receive a trusted certificate and equipment private key from a trusted authorization center associated with the cloud computing system.

13. The computer-implemented method of claim 12, further comprising:

sending, by the first entity to the trusted authorization center, an authorization request, wherein the trusted authorization center comprises a plurality of trusted control nodes, and wherein a respective trusted control node maintains a share of a system private key;

receiving from the trusted control nodes a set of subkeys, wherein a respective subkey received from a particular trusted control node is generated based on identity information associated with the first entity, trusted-computing platform information associated with the first entity, and a share of the system private key stored in the particular trusted control node; and generating an equipment private key specific to the first entity based on the received set of subkeys.

14. A network entity, comprising:

a processor; and a storage device coupled to the processor and storing instructions which when executed by the processor cause the processor to perform a method for negotiating quantum data keys between the network entity and a second network entity, wherein the method comprises:

performing a mutual authentication between the network entity and the second network entity;

in response to the mutual authentication succeeding, receiving one or more sets of key-generation parameters from the second network entity;

in response to validating the sets of key-generation parameters, sending an acknowledgment message to the second network entity;

extracting, from a quantum string shared between the network entity and the second network entity, one or more quantum data keys based on the key-generation parameters, wherein a respective quantum data key comprises a number of bits extracted from the quantum string; and establishing a quantum-enhanced secure communication channel between the first and second entities.

15. The network entity of claim 14, wherein the network entity and the second network entity are each equipped with a trusted-computing module, and wherein performing the mutual authentication comprises exchanging a trusted measurement report associated with each of the network entity and the second network entity.

16. The network entity of claim 15, wherein the method further comprises storing the extracted quantum data keys within the trusted-computing module.

17. The network entity of claim 14, wherein the quantum string shared between the network entity and the second network entity is obtained via a quantum key distribution (QKD) process.

18. The network entity of claim 14, wherein a respective set of key-generation parameters specifies a plurality of keys having a same length, and wherein the set of key-generation parameters comprises:

a number parameter specifying a number of keys to be generated;

a length parameter specifying a bit length of the to-be-generated keys; and a position parameter specifying a starting position of an initial to-be-generated key within the quantum string shared between the network entity and the second network entity.

19. The network entity of claim 14, wherein a respective set of key-generation parameters specifies a single to-be-generated key, and wherein the set of key-generation parameters indicates the length of the single to-be-generated key and the starting position of the single to-be-generated key.

20. The network entity of claim 19, wherein the lengths and starting positions of at least two keys are specified such that the two keys partially overlap, thereby resulting in a total number of bits in the extracted quantum data keys being more than a total number of bits in the quantum string shared between the network entity and the second network entity.

21. The network entity of claim 14, wherein receiving the one or more sets of key-generation parameters further comprises receiving a hash function calculated by the second network entity based on the key-generation parameters and a shared secret, and wherein validating the sets of key-generation parameters comprises comparing the received hash function with a hash function calculated by the network entity.

22. The network entity of claim 14, wherein sending the acknowledgment message comprises:
- calculating a variation of at least one key-generation parameter;
- encrypting, using an encryption key, the calculated variation to obtain an encrypted message; and
- sending the encrypted message.

23. The network entity of claim 14, wherein the received one or more sets of key-generation parameters are encrypted using an encryption key associated with the network entity.

24. The network entity of claim 14, wherein the network entity and the second network entity belong to a cloud computing system, and wherein the network entity or the second network entity comprises one of:
- a piece of equipment provided by a cloud provider; and
- a piece of equipment provided by a cloud client.

25. The network entity of claim 24, wherein the network entity and the second network entity each receive a trusted certificate and equipment private key from a trusted authorization center associated with the cloud computing system.

26. The network entity of claim 25, wherein the method further comprise:
- sending, by the network entity to the trusted authorization center, an authorization request, wherein the trusted authorization center comprises a plurality of trusted control nodes, and wherein a respective trusted control node maintains a share of a system private key; receiving from the trusted control nodes a set of subkeys, wherein a respective subkey received from a particular trusted control node is generated based on identity information associated with the network entity, trusted-computing platform information associated with the network entity, and a share of the system private key stored in the particular trusted control node; and
- generating an equipment private key specific to the network entity based on the received set of subkeys.

* * * * *